US012479311B2

(12) United States Patent
Wagner et al.

(10) Patent No.: US 12,479,311 B2
(45) Date of Patent: Nov. 25, 2025

(54) TORQUE CONTROL BASED ON VARIATION IN TIRE SIZE

(71) Applicant: Deere & Company, Moline, IL (US)

(72) Inventors: Jack T. Wagner, Dubuque, IA (US); Kirk E. B. Rudolph, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 278 days.

(21) Appl. No.: 18/067,059

(22) Filed: Dec. 16, 2022

(65) Prior Publication Data

US 2024/0198811 A1 Jun. 20, 2024

(51) Int. Cl.
 *B60L 15/20* (2006.01)
(52) U.S. Cl.
 CPC .......... *B60L 15/20* (2013.01); *B60L 2200/40* (2013.01); *B60L 2240/12* (2013.01); *B60L 2240/421* (2013.01); *B60L 2240/423* (2013.01); *B60L 2240/461* (2013.01)
(58) Field of Classification Search
 CPC .. B60L 15/20; B60L 2200/40; B60L 2240/12; B60L 2240/421; B60L 2240/423; B60L 2240/461
 See application file for complete search history.

(56) References Cited

U.S. PATENT DOCUMENTS

| | | | |
|---|---|---|---|
| 8,843,285 B2 | 9/2014 | Gratton et al. | |
| 2009/0204361 A1* | 8/2009 | Watasue | B60C 23/0408 340/447 |
| 2011/0238251 A1* | 9/2011 | Wright | B60W 30/18172 701/22 |
| 2014/0277883 A1* | 9/2014 | Pulliam | B61C 3/00 701/22 |
| 2015/0336609 A1* | 11/2015 | Smith | F16H 61/47 701/41 |
| 2020/0087889 A1* | 3/2020 | Fritz | B60C 11/246 |
| 2020/0122755 A1* | 4/2020 | Claussen | B60L 15/2045 |

FOREIGN PATENT DOCUMENTS

| | | | | |
|---|---|---|---|---|
| DE | 69829516 T2 * | 3/2006 | | G01P 3/56 |
| DE | 102014223691 A1 * | 12/2015 | | B60W 30/02 |
| DE | 102019212324 A1 * | 3/2020 | | B60W 10/08 |

OTHER PUBLICATIONS

German Search Report issued in application No. 102023127566.6 dated Apr. 22, 2024, 12 pages.

* cited by examiner

Primary Examiner — Rachid Bendidi
Assistant Examiner — Nada Mahyoob Alqaderi
(74) Attorney, Agent, or Firm — Christopher J. Volkmann; KELLY, HOLT & CHRISTENSON P.L.L.C.

(57) ABSTRACT

A work machine has a plurality of motors. Each motor drives a subset of a plurality of wheels/tires on the work machine. A motor control system controls one of the motors to drive the corresponding wheel/tire at a calibration speed and detects the rotational velocity of each of the other wheels/tires. A tire size indicator is generated which indicates a tire size relationship among the plurality of different tires. The tire size indicator is stored or output for use by a traction control system. The traction control system uses the tire size indicator for the different tires to generate torque command signals to the plurality of different motors.

17 Claims, 9 Drawing Sheets

TORQUE CONTROL BASED ON VARIATION IN TIRE SIZE

FIELD OF THE DESCRIPTION

The present description relates to work machines. More specifically, the present description relates to controlling motor torque for motors driving tires based upon tire size.

BACKGROUND

There are a wide variety of different types of work machines. Such work machines can include loaders, articulated loaders, dump trucks, articulated dump trucks, motor graders, tractors, and a wide variety of other work machines. Some such work machines include a propulsion system in which the speed of each tire can be independently controlled.

In one example, a different motor is mounted to the work machine to drive each of the different tires. Each motor may drive a tire either directly, through a set of fixed or variable gears, or in other ways. Such work machines also include a torque control system that generates a different torque output to each of the different motors. The outputs command the corresponding motors to drive the vehicle at a common speed.

The discussion above is merely provided for general background information and is not intended to be used as an aid in determining the scope of the claimed subject matter.

SUMMARY

A work machine has a plurality of motors. Each motor drives a subset of a plurality of wheels/tires on the work machine. A motor control system controls one of the motors to drive the corresponding wheel/tire at a calibration speed and detects the rotational velocity of each of the other wheels/tires. A tire size indicator is generated which indicates a tire size relationship among the plurality of different tires. The tire size indicator is stored or output for use by a traction control system. The traction control system uses the tire size indicator for the different tires to generate torque command signals to the plurality of different motors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, some work machines have a set of wheels where a separate motor drives each individual wheel. The motors receive a torque command signal from a control system that commands the torque of the motor to attain a desired speed. In order to generate the torque command signal, the control system uses a tire size assumption (as well as an articulation angle in articulated vehicles) to attain a desired wheel speed.

However, the wheels on such work machines often have tire sizes (e.g., rolling radii) that are different from the assumed size. Also, the tires may have different sizes from one another for a variety of different reasons. For instance, where the work machine is a loader, the front tires (which may be solid tires) often wear more quickly than the rear tires. Also, the tires on a work machine may be of varying age so they have worn differently. Further, different brands of tires may have different radii. Also, where the tires are inflated tires, the inflation pressure may be different on the different tires so that their rolling radii are also different.

Thus, the vehicle may command a state where the electric motors are unstable or fighting each other. This is because the calculated wheel speed feedback is inaccurate when using the assumed tire size.

The present discussion thus proceeds with respect to a system that calculates the tire size (e.g., rolling radii) and uses the tire size to replace the tire size assumption in the control system. In one example, in order to detect tires sizes, one of the motors is driven at a desired calibration speed while the other motors are inactive and the tires corresponding to the inactive motors are rotated by the ground, as the machine is driven along the ground at the calibration speed. The rotational velocity of each motor (and thus each tire) is then detected or calculated. The tire size (e.g., radius) of each tire is then identified using the rotational velocity and the calibration speed. The tire size may be an absolute tire size (such as the absolute radius of a particular tire) or may identify a relationship of the tire sizes relative to one another (e.g., different tire size ratios among the different tires). The tire size can then be used to more accurately generate torque commands than when assumed tire sizes are used.

Figure 1:
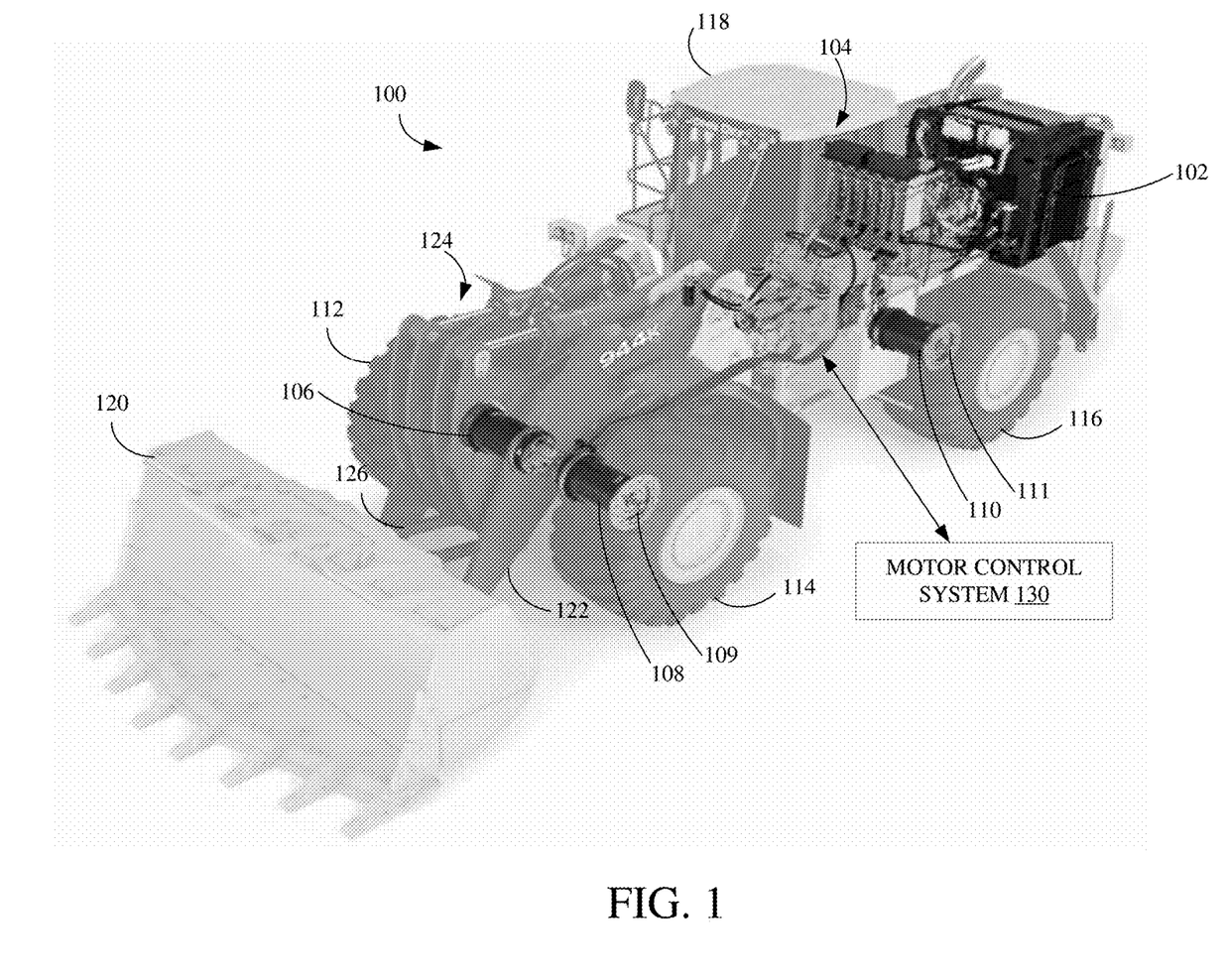
FIG. 1 is a partial pictorial partial block diagram illustrating one example of a work machine.

FIG. 1 is a pictorial illustration of one example of a work machine 100 in which portions of the work machine 100 are shown in shadow. In the example shown in FIG. 1, work machine 100 is a loader that has an engine 102, generators 104, electric motors 106, 108, and 110, that each drive a corresponding wheel 112, 114, and 116 respectively. Machine 100 also has an operator compartment 118, boom 122, and a bucket 120. A motor control system 130 generates torque control signals to control the motors 106, 108, and 110.

It will be noted that in the example shown in FIG. 1, loader 100 has a plurality of ground-engaging wheels 112, 114, and 116. It will be appreciated that machine 100 has another wheel, opposite wheel 116, which is not shown. Each of the wheels is driven by a separate motor. In the example in FIG. 1, motor 106 is coupled to wheel 112 through a fixed gear arrangement, and rotation of the output of motor 106 drives rotation of wheel 112. Similarly, motor 108 is connected to wheel 114 so that rotation of the output 109 of motor 108 drives rotation of wheel 114. Motor 110 is connected to wheel 116 so that the rotation of the output 111 of motor 110 drives rotation of wheel 116. It is also contemplated that an additional motor (not shown) drives rotation of an additional wheel (also not shown) that is mounted on machine 100 opposite wheel 116.

In operation, in the example shown in FIG. 1, motors 106, 108, and 110 are electrical motors. Engine 102 (which may be a diesel engine or another engine) is connected to generators 104. Engine 102 also powers actuators, such as hydraulic pumps, etc. As engine 102 drives generators 104, generators 104 convert rotational energy from engine 102 into electrical energy which is provided to power the electric motors 106, 108, and 110. Motor control system 130 (described in greater detail elsewhere herein) generates motor control signals and provides the motor control signals to the individual motors 106, 108, and 110 in order to control the direction of rotation of motors 106, 108, and 110, and the torque output. The motors 106, 108, and 110 are independently driven so they can be commanded to output different torque, even if that means the motors rotate at different speeds from one another.

In one example, operator compartment 118 may have an operator interface system with operator interface mechanisms so that an operator can control and manipulate machine 100. FIG. 1 also shows that loader bucket 120 is supported for movement by boom 122 and positioned by one or more actuators. The actuators may be hydraulic cylinders, pneumatic actuators, or other types of actuators. In the example shown in FIG. 1, boom 122 is driven by one or more lift cylinders 124. Bucket 120 may also be positioned using one or more tilt cylinders 126. Actuation of lift and tilt cylinders 124 and 126, respectively, is illustratively performed based on operator inputs or automated inputs.

Also, in the example shown in FIG. 1, work machine 100 is an articulated loader. The angle of articulation can be controlled by an operator by controlling the actuation of articulation actuators. The articulation actuators can control the angle of actuation of the front wheels 112 and 114 relative to the rear wheels 116 (and the wheel not shown) on loader 110.

In the present discussion, it is assumed that wheels 112, 114, and 116 have tires mounted to them. Therefore, when discussing wheel size, it is assumed that the wheel size includes the size of the tires. The motor control system 130 may control the torque applied by the motors to obtain a desired rim pull, which is the force available at the road surface. The desired rim pull is translated into a torque command. The translation takes into account vehicle parameters, such as the wheel size (the wheel radius) and the gear ratio between the motors and wheels. As discussed above, it may be that the wheels 112, 114, and 116 have different sizes (such as different radii), because the tires have different sizes. In that case, when the motor control system 130 is attempting to control the torque output by the motors to obtain a rim desired pull, it can be difficult to do so accurately without knowing the different tire sizes of the different wheels, or at least without knowing a relationship of the sizes of the different tires relative to one another. For instance, assume that machine 100 is not in an articulated position (e.g., machine 100 has an articulation angle of 0°) and is traveling in the forward direction. In that case, it may be desirable for the motor control system 130 to control all of the motors 106, 108, 110 (and the motor that is not shown) so that the corresponding wheels are all obtaining a desired rim pull, assuming that all the wheels are the same size (have the same radius). However, if the tires are of different sizes, then their corresponding motors should actually be controlled to output a different torque than the other motors, based on the tire size, because the translation from rim pull to torque considers the tire size (the tire radius). Assume, for example, that the tires on front wheels 112 and 114 are smaller than the tires on rear wheels 116 (and the rear wheel that is not shown) because the tires on the front wheels 112 and 114 have undergone more wear. In that case, the motor control system 130 would desirably drive the front motors 106 and 108 to output a higher torque than the rear motors so that the wheels 112 and 114 are rotating quickly enough relative to the rear wheels to maintain a desired overall rim pull for machine 100 and so the motors are not fighting against one another. Similarly, where machine 100 has a traction control system, the traction control system may monitor the speed of rotation of the different wheels to determine whether one or more of the wheels is out of engagement with the ground. When that occurs, the traction control system may wish to control the motor driving the wheel that is out of engagement with the ground to output lower torque relative to the other wheels, until that wheel comes back into engagement with the ground. Again, this type of torque control can be difficult if the tires do not match an assumed or nominal tire size. When the rolling radii of each of the wheels is different, the traction control system will not be commanding the correct torque output for the corresponding electric motors, in order to achieve desired traction performance, unless the size variation is known.

Figure 2:
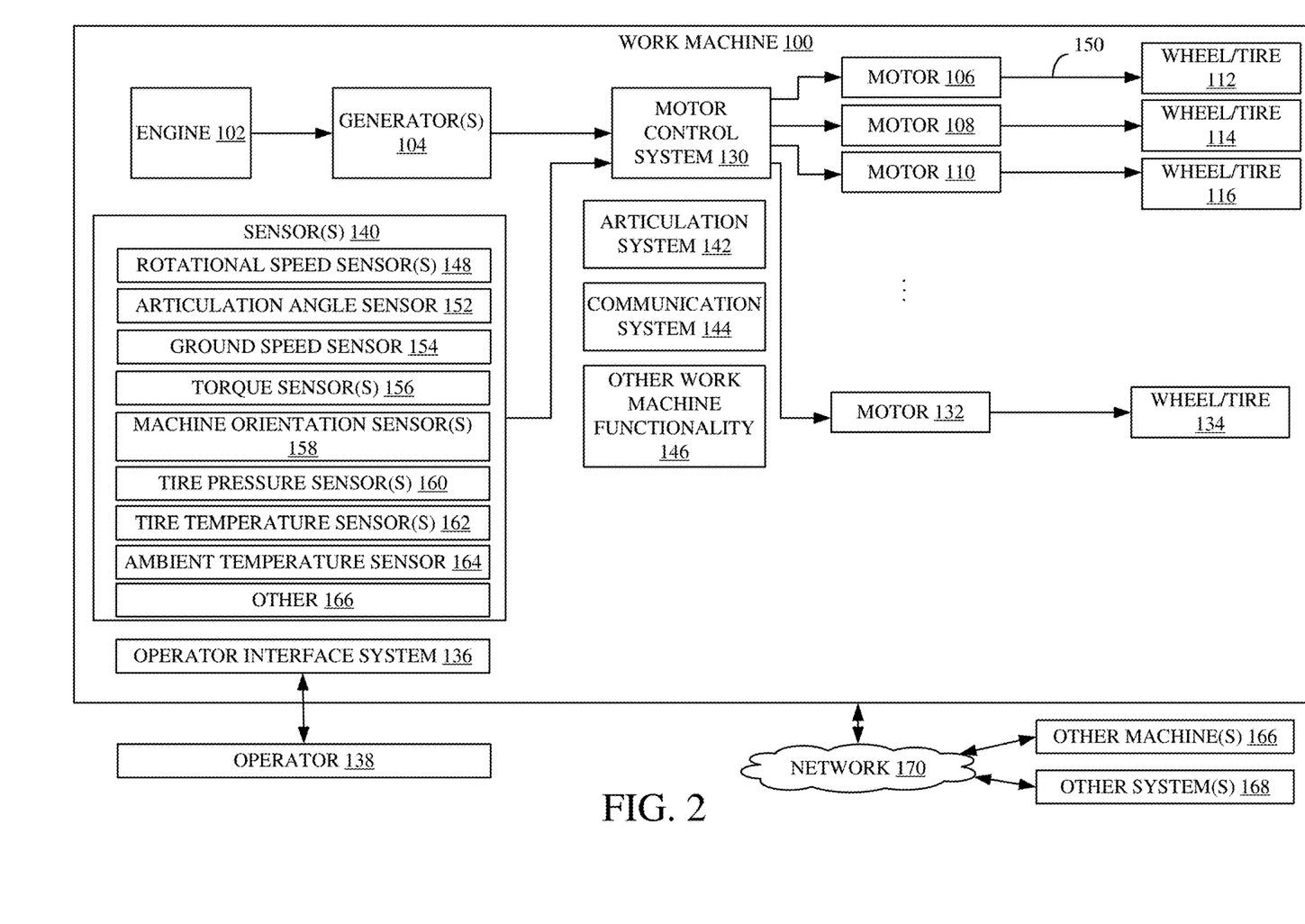
FIG. 2 is a block diagram showing one example of a work machine.

FIG. 2 is a block diagram of work machine 100. Some of the items shown in FIG. 2 are also shown in FIG. 1, and are similarly numbered. In addition to the items shown in FIG. 1. FIG. 2 shows that work machine 100 includes an additional wheel 134 driven by an additional motor 132. Wheel 134 may be opposite wheel 116 (in FIG. 1) and motor 132 may be opposite motor 110 (as shown in FIG. 1). Further, FIG. 2 shows that work machine 100 can include an operator interface system 136, which may be located in operator compartment 118, so that an operator 138 can control and manipulate work machine 100. Operator interface system 136 can thus include operator interface mechanisms such as joysticks, pedals, linkages, a steering wheel, buttons, levers, a display system, and/or any of a wide variety of other audio, visual, and haptic systems that can provide information to operator 138 and/or receive inputs from operator 138. For example, a display system may display operator actuatable mechanisms, such as icons, links, etc., which may be actuated by operator 138 using a point and click device or touch gestures (where a touch screen is provided). Similarly, the operator actuatable items may be actuated using voice commands (such as where speech recognition and speech synthesis are provided).

In the example shown in FIG. 2, work machine 100 also includes one or more sensors 140, articulation system 142, communication system 144, and other work machine functionality 146. Sensors 140 may include rotational speed sensor(s) 148, articulated angle sensor 152, ground speed sensor 154, one or more torque sensors 156, machine orientation sensor 158, tire pressure sensors 160, tire temperature sensors 162, ambient temperature sensors 164, and any of a wide variety of other sensors 166. Further, FIG. 2 shows that work machine 100 can use communication system 144 to communicate with other machines 166 and/or other systems 168 over network 170. Other machines 166 can include other work machines, or any of wide variety of other machines that are at the same worksite, or a different worksite, as work machine 100. Other systems 168 can include manager systems, remote server systems (such as cloud-based systems), vendor systems, manufacturer systems, or any of a wide variety of other computing systems.

Network 170 may thus include a wide area network, a local area network, a near field communication network, a Bluetooth network, a Wi-Fi network, a cellular network, or any of a wide variety of other networks or combinations of networks. Thus, communication system 144 enables communication among the items on work machine 100, and communication over network 170. Communication system 144 may include a controller area network (CAN) bus and bus controller and any other communication systems needed to communicate over network 170.

Articulation system 142 facilitates the articulation of work machine 100 so that the front wheels 112 and 114 can be articulated relative to the rear wheels 116 and 134 by an articulation angle which may be controlled based upon an input from operator 138 or in other ways. The articulation system 142 may include articulation actuators that drive the articulation of machine 100 to a desired articulation angle.

Rotational speed sensors 148 sense the rotational speed of the different wheels 112, 114, 116, and 134. Rotational speed sensors 148 can be located in motors 106, 108, 110, and 112 or can be located on or near wheels 112, 114, 116, and 134, or sensors 148 can be located elsewhere. For example, assume that a rotational speed sensor 148 is located on motor 106 and detects the speed of rotation of the output of motor 106. Assume also that motor 106 is coupled to wheel 112 by a link 150 which may be a fixed gear link or another link having a fixed or variable gear ratio. Sensor 148 may sense the speed of rotation of motor 106 and, using the gear ratios in link 150, also generate an output indicative of the speed of rotation of wheel 112. Other examples of rotational speed sensors 148 are contemplated herein as well.

Articulation angle sensors 152 may be configured relative to articulation system 142 to sense the articulation angle of work machine 100. Sensor 152 can thus be an angle encoder, and a Hall effect sensor, potentiometer, an actuator position sensor, or any of a wide variety of other sensors.

Ground speed sensor 154 illustratively senses the ground speed of work machine 100, as it travels over the ground. Ground speed sensor 154 may thus be a speedometer, a global navigation satellite system (GNSS) receiver, a RADAR system, a LIDAR system, or any of a wide variety of other systems that can detect and output an indication of the ground speed of work machine 100, or an output that can be used to derive the ground speed of work machine 100. For instance, where ground speed sensor 154 is a GNSS receiver, the position of work machine 100 can be obtained, a plurality of different times, from the GNSS receiver and the ground speed and heading of machine 100 can be identified based upon those two positions.

Torque sensors 156 can be used to sense the torque generated by the different motors 106, 108, 110, and 132. Orientation sensors 158 can be inertial measurement units, accelerometers, or any of a wide variety of other sensors that can sense the orientation or pose of work machine 100 in space. Thus, machine orientation sensors 158 can generate an output indicative of whether work machine 100 is on flat or level ground, on an incline or decline, on a side slope, etc.

Tire pressure sensors 160 and tire temperature sensors 162 illustratively generate an output indicative of the pressure and temperature, respectively, of the different tires on wheels 112, 114, 116, and/or 134. Ambient temperature sensor 164 can be used to detect the ambient temperature in which work machine 100 is working. Sensors 140 can include a wide variety of other sensors 166 as well.

As discussed above, motor control system 130 can be used to control the torque output by motors 106, 108, 110, and 132. In order to perform a calibration operation which identifies the sizes of the different wheels 112, 114, 116, and 134, or which identifies a relationship among the sizes, motor control system 130 generates an output commanding one of motors (e.g., motor 106) to drive one of the wheels (e.g., wheel 112) at a nominal speed (such as 5 mph), while other motors 108, 110, and 132 are inactive so that their corresponding wheels 114, 116, and 134 are being driven by contact with the ground over which machine 100 is traveling. Rotational speed sensors 148 then sense the rotational speed of each of the wheels 112, 114, 116, and 134. Based upon the nominal speed used to drive motor 106 (and wheel 112) and based upon the rotational speeds of each of the wheels 112, 114, 116, and 134, a relationship indicative of how the sizes of each of the wheels 112, 114, 116, and 134 relate to one another, can be obtained. That relationship can then be used by motor control system 130 in generating the torque command signals for each of the individual motors 106, 108, 110, and 132.

In one example, where ground speed sensor 154 is provided, so that the actual ground speed of work machine 100 can be identified (as opposed to the nominal speed commanded to drive motor 106), then the absolute or actual size of each of the wheels 112, 114, 116, and 134 can be obtained as well. The actual size can then be used by motor control system 130 in generating the torque command signals for each of the corresponding motors 106, 108, 110, and 132. For instance, if motor control system 130 determines (either by the relationship of the size of the wheels relative to one another, or by the actual size of the wheels) that wheel 112 is smaller than wheel 114, then motor control system 130 can generate the motor torque control (or command) signal to motor 106 to output a different torque than motor 108 so that the rim pull on both wheels 112 and 114 are propelling machine 100 at the same linear velocity. The same type of operation can be conducted in order to generate the torque control signals to each of the motors 106, 108, 110, and 132 based upon the absolute sizes of the corresponding wheels 112, 114, 116, and 134, respectively, or based upon the relationship of the sizes of those wheels relative to one another.

Figure 3:
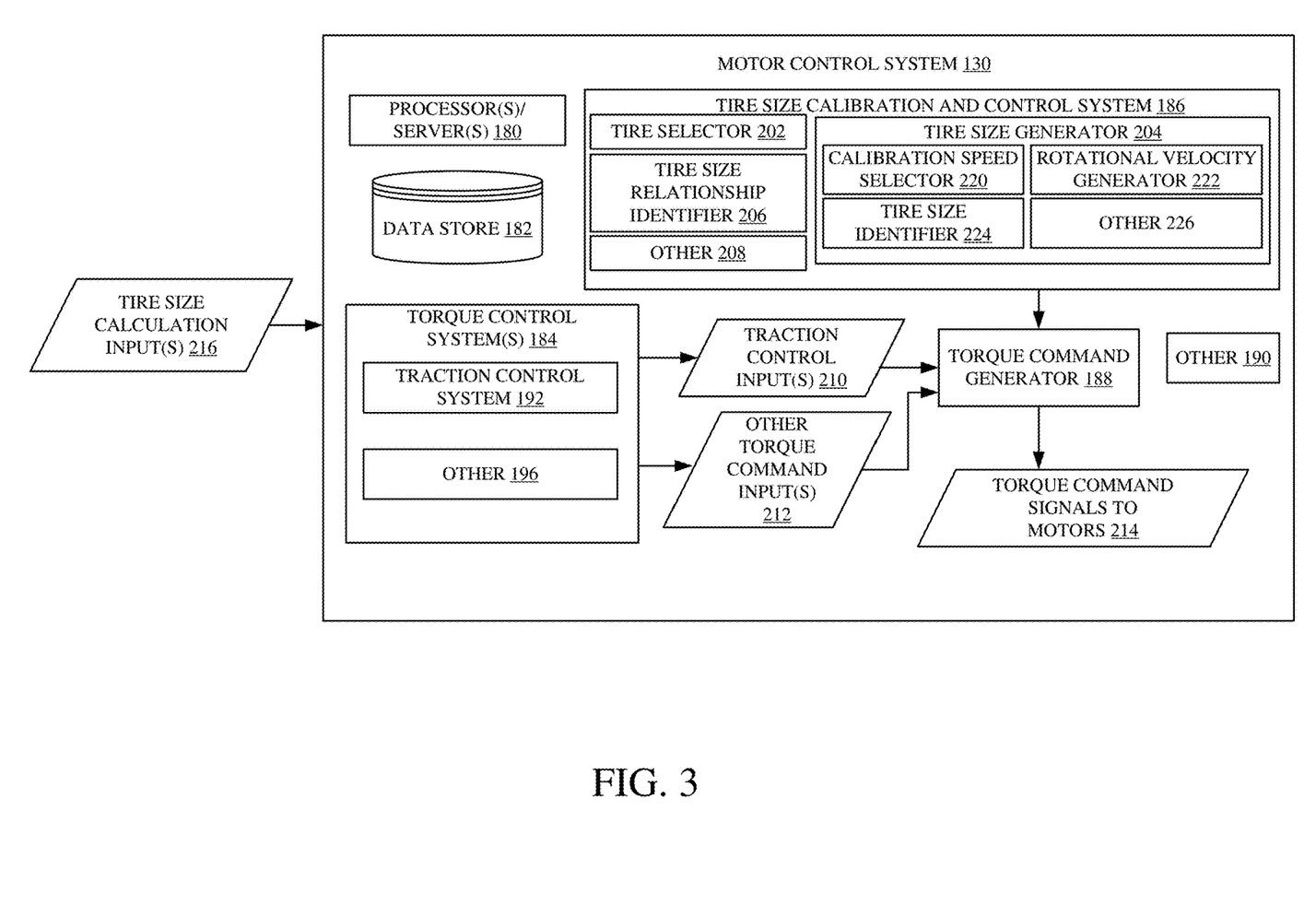
FIG. 3 is a block diagram showing one example of a motor control system.

FIG. 3 is a block diagram showing one example of motor control system 130 in more detail. FIG. 3 shows that, in one example, motor control system 130 includes one or more processors or servers 180, data store 182, one or more torque control systems 184, tire size calibration and control system 186, torque command generator 188, and other items 190. Torque control systems 184 can include traction control system 192, and other control systems 196. Tire size calibration and control system 186 can include calibration trigger detector 198, calibration condition identifier 200, tire selector 202, tire size generator 204, tire size relationship identifier 206, and other items 208. Tire size generator 204 can include calibration speed selector 220, rotational velocity generator 222, tire size identifier 224, and other items 226.

Tire size calibration and control system 186 identifies the tire sizes, or wheel sizes, or relationships, among the different tire sizes (or wheel sizes), and provides that to torque command generator 188. Torque command generator 188 receives inputs from torque control system 184 (such as from traction control inputs 210, or other torque command inputs 212) and generates torque command signals 214 to the motors 106, 108, 110, and 132 based upon the tire size or tire size relationship indicator output by tire size calibration and control system 186 and based upon other command inputs, such as traction control inputs 210, and other torque command inputs 212. Tire size calibration and control system 186 can also receive tire size calculation inputs 216 (e.g., from sensors 140 or other items) in order to generate the tire sizes or tire size indicator that indicates a relationship among the tire sizes.

It will be noted that, in one example, tire size calibration and control system 186 can perform a tire size calibration operation to identify tire sizes automatically, during the operation of machine 100. By automatically it is meant, for example, that the function or operation is performed without further human involvement except, perhaps, to initiate or authorize the function or operation. In another example, system 186 can perform the operation in response to an operator input or otherwise.

Calibration trigger detector 198 detects trigger criteria indicative of when a calibration is to be performed by system 186. For instance, calibration trigger detector 198 may detect time-based trigger criteria detecting that a calibration should be performed after a number of hours of operation of machine 100 have occurred. The calibration trigger criteria may be based on other criteria as well. For instance, if the tire sizes changed by a relatively large amount during a previous calibration operation then this may mean that the next calibration operation should be performed more quickly, whereas if the tire sizes changed by a relatively small amount during the prior calibration operation, this may mean that the tire calibration operation need not be performed as frequently. Thus, calibration trigger detector 198 detects calibration trigger criteria to determine whether system 186 should perform a tire size calibration and control operation.

Once a calibration operation is triggered, calibration condition identifier 200 determines when the conditions are suitable to perform a calibration operation. For instance, it may be desirable to perform the calibration operation on a relatively flat, firm surface so tire slippage is unlikely to occur while the calibration operation is being performed. Calibration condition identifier 200 can thus determine whether machine 100 is on a flat surface based upon the orientation or pose of the machine output by orientation sensors 158, and the characteristics of the soil based upon another sensor input, an operator input, a soil mapping input, or another input. It may also be desirable to perform the calibration operation when the front wheels of machine 100 are not articulated relative to the rear wheels (e.g., when the machine is not turning). Thus, calibration condition identifier 200 may determine the articulation angle of machine 100 based upon the output of articulation angle sensor 152. Calibration condition identifier 200 can generate an output indicative of when the calibration conditions occur or are sufficient so that the calibration operation can be performed.

Once it is determined that a tire size calibration operation is to be performed and that the conditions are appropriate for performing that operation, then system 186 identifies the sizes of the different tires (or relationships among those different sizes). It will be appreciated that system 186 can make that determination for all of the tires at once (by processing the tire sizes in parallel) or by determining the tire sizes or relationships sequentially by processing the tire sizes sequentially. For purposes of the present discussion, it will be assumed that tire size calibration and control system 186 performs a tire size calibration for the tires sequentially, but that is for the sake of example only.

Tire selector 202 thus selects one of the tires (e.g., the tire on wheel 112), for size calibration. Calibration speed selector 220 selects a speed at which to drive one of the motors during the calibration process. The calibration speed may be selected based on an operator input, using a default value, or in other ways. Rotational velocity generator 222 then receives the rotational velocity signals from rotational speed sensors 148 indicative of the rotational velocity of either the motors or the wheels. If the rotational velocity of the motors is identified by the sensor signal from rotational speed sensors 148, then rotational velocity generator 222 calculates the rotational velocity of the wheels based upon the gear ratio of the link connecting the motor to the corresponding wheel. Tire size identifier 224 then identifies the tire size based upon the commanded speed and the rotational velocity of the wheel. In one example, where the ground speed of machine 100 is known (e.g., detected using ground speed sensor 154), the tire size is calculated as a tire size indicator that identifies the absolute tire size (e.g., rolling radius) of each of the different tires.

The tire size identifier 224 can aggregate (e.g., average) sensor values to identify the size of the tire. Tire selector 202 can select each of the tires and tire size generator 204 can identify the size of each of the tires (on each of the wheels). In another example, when the actual ground speed of machine 100 is not known (e.g., where no ground speed sensor 154 is present) the tire size relationship identifier 206 generates a relationship between the sizes of the different tires such as the ratios of the different sizes (e.g., the rolling radius of the tire on wheel 112 is 10% larger than the rolling radius of the tire on wheel 114, etc.). For instance, tire size relationship identifier 206 can generate an output indicative of the different ratios of the tire sizes (or the ratios of each of the tire sizes relative to a selected one of the tire sizes, etc.).

The tire size and/or tire size relationship can be output from tire size calibration and control system 186 to torque command generator 188. Torque command generator 188 can generate a torque command signal 214 to each of the motors 106, 108, 110, and 132 based upon a desired torque output by torque control system 184, and based upon the absolute sizes of the tires on the different wheels or the relationship among the sizes. The torque command signals 214 are provided to the different motors 106, 108, 110, and 132 to command them to generate the desired torque.

Figure 4:
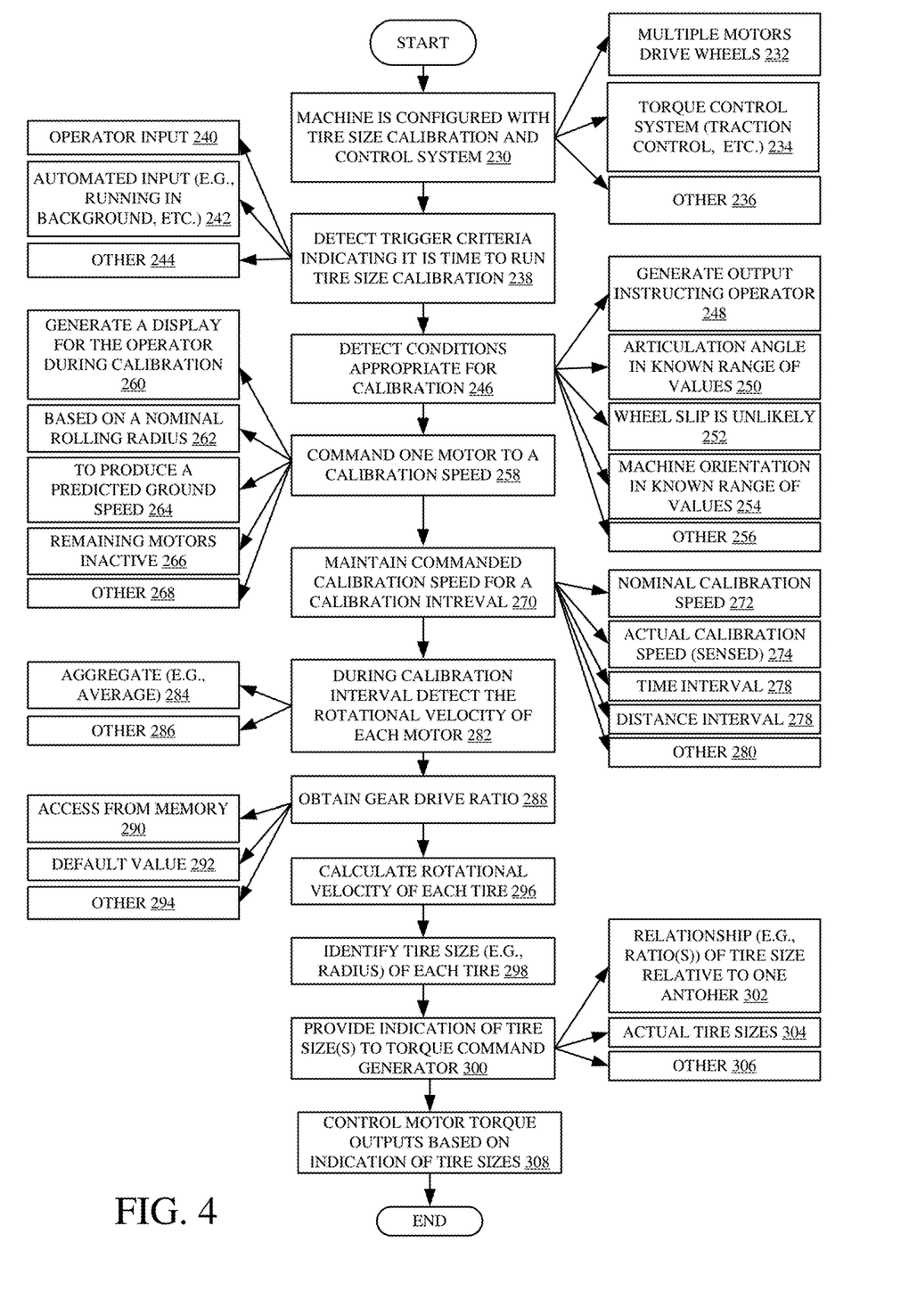
FIG. 4 is a flow diagram showing one example of the operation of a work machine.

FIG. 4 is a flow diagram illustrating one example of the operation of work machine 100, and motor control system 130, in controlling the torque outputs of the different motors 106, 108, 110, and 132 based upon the tire sizes on the different wheels 112, 114, 116, and 134. It is first assumed that machine 100 is configured with tire size calibration and control system 186, as indicated by block 230 in the flow diagram of FIG. 4. It is also assumed that machine 100 has multiple different motors that each drive one or more different wheels, as indicated by block 232. Further, it is assumed that machine 100 has a torque control system 184, which may be a traction control system, etc., as indicated by block 234 in the flow diagram of FIG. 4. The machine 100 can be configured in other ways as well, as indicated by block 236.

At some point, calibration trigger detector 198 detects trigger criteria indicating that it is time to perform a speed calibration operation as indicated by block 238 in the flow diagram of FIG. 4. The trigger criteria can be based on an operator input 240 or an automated input (e.g., when tire size calibration and control system 186 is performing calibration in the background of the operation of machine 100), as indicated by block 242. The trigger criteria can be detected in other ways and can be other forms of trigger criteria as well, as indicated by block 244.

Calibration condition identifier 200 then detects that the conditions are appropriate to perform the tire size calibration operation as indicated by block 246. For instance, calibration condition identifier 200 can generate an output on a user interface display instructing operator 138 how to place machine 100 in the proper condition for calibration, as indicated by block 248. By way of example, the output may instruct the operator to move machine 100 to a flat and level area of ground, with a firm (e.g., concrete) surface so that tire slip is unlikely. The display may also instruct the operator to orient machine 100 so that it is not articulated (e.g., the articulation angle is zero or that the articulation angle is within a known range of angles, etc.). Moving the machine 100 so that the articulation angle is zero or within some known range of values is indicated by block 250 in the flow diagram of FIG. 4. Moving machine 100 to a surface where wheel slip is unlikely is indicated by block 252. It may also be that the calibration is more accurate when the ground is level so that the machine orientation is within a desired range of values, as indicated by block 254. The conditions for calibration can be any of a wide variety of other conditions as well, as indicated by block 256.

Calibration speed selector 220 then generates an output to torque command generator 188 indicating that one of the motors 106, 108, 110, and 132 should be commanded to drive its corresponding wheel at a desired calibration speed, as indicated by block 258 in the flow diagram of FIG. 4, while leaving the other motors inactive. For instance, in one example calibration speed selector 220 can generate an output on an operator display instructing operator 138 to manually control one of the motors to operate at the calibration speed, as indicated by block 260. The calibration speed can be manually or automatically selected based upon an assumed nominal rolling radius of the wheel that is to be driven, as indicated by block 262. The calibration speed can be selected automatically or manually to produce a predicted ground speed, as indicated by block 264.

When the one motor is driven at the calibration speed, then the other motors remain in an inactive state so that their corresponding wheels can be driven by contact with the ground, as indicated by block 266. The selected motor can be commanded to a calibration speed in other ways as well, as indicated by block 268.

In order to perform the calibration operation, torque command generator 188 maintains the commanded calibration speed, for the selected motor, for a calibration interval, as indicated by block 270. The calibration speed can be an assumed (or nominal) calibration speed 272, or it can be an actual, sensed calibration speed 274 where a ground speed sensor 154 is included on machine 100. The calibration interval can be a time interval 276 or a distance interval (over which machine 100 travels during the calibration operation) as indicated by block 278. The machine 100 can be maintained at the calibration speed for a calibration interval in other ways as well, as indicated by block 280.

During the calibration interval, rotational velocity generator 222 receives the rotational velocity signals for each motor 106, 108, 110, and 132, as indicated by block 282. The rotational velocity can be based upon aggregated values from rotational speed sensors 148 (e.g., a plurality of different values can be averaged together for one of the motors) as indicated by block 284, or the rotational velocity can be an instantaneous value or other values obtained in other ways, as indicated by block 286.

The rotational velocity generator 222 then obtains or accesses the gear drive ratio in the link connecting each motor with its corresponding wheel, as indicated by block 288. This gear ratio can be accessed from memory (such as from data store 182, as indicated by block 290, or the ratio can be a default value 292, or received from an operator or obtained in other ways, as indicated by block 294.

Rotational velocity generator 222 then calculates the rotational velocity of the tire on each of the wheels 112, 114, 116, and 134, based upon the rotational velocity of the motor and the gear ratio that connects the motor to the corresponding wheel. Calculating the rotational velocity of each tire is indicated by block 296 in the flow diagram of FIG. 4. It should also be noted that where the rotational speed sensors 148 sense the rotational speed of the wheel directly, then that value can be used as the rotational speed of the wheels, and the rotational speed of the corresponding motor need not be used in conjunction with the gear ratio of the link connecting the motor to the wheel, in order to obtain the rotational velocity of each tire. The latter method (sensing the rotational velocity of each motor and calculating the rotational velocity of each tire) is described herein for the sake of example only.

Tire size relationship identifier 206 then identifies the tire size (e.g., rolling radius) of each tire, as indicated by block 298 in the flow diagram of FIG. 4. In one example, the tire size is calculated by using Equation 1, as follows:

$$r_i = \frac{v}{\omega_{ti}} \quad \text{EQ. 1}$$

where, $r_i$ = radius of tire "$i$" [m]

$v$ = ground speed [m/s]

$\omega_t$ = rotation velocity of tire "$i$" [rad/s] =

$$\frac{\text{Rotational Velocity of } \textit{Emachine} \text{ Powering Tire "}i\text{"}(\omega_{mi})}{\text{Final Drive Ratio}}$$

It will be noted that, if the nominal radius is not exact for all four tires (e.g., where there is no ground speed sensor to sense the actual ground speed, and instead where a nominal speed is assumed based upon the commanded speed for the driving motor used during the calibration process.), then the resulting absolute radii for each individual tire may not be exactly correct as well. However, tire size relationship identifier 206 can still provide an output indicative of the tire sizes of each of the tires to speed command generator 188, or the relationships among the sizes, as indicated by blocks 300 and 302 in the flow diagram of FIG. 4. Where the actual ground speed in known during the calibration process, because machine 100 has a ground speed sensor 154, then the actual tire sizes (e.g., the actual rolling radii) of each tire can be output by tire size relationship identifier 206 as indicated by block 304 in the flow diagram of FIG. 4. The indication of the tire sizes can be output to torque command generator 188 in other ways as well, as indicated by block 306.

Torque command generator 188 then controls the motor torque outputs of the different motors 106, 108, 110, and 132 based upon the indication of tire sizes (and also based upon command speeds from the operator, from control systems 184, etc.). Controlling the motor torque outputs based upon the indication of tire sizes in indicated by block 308 in the flow diagram of FIG. 4.

It can thus be seen that the present description proceeds with respect to a system that identifies either the actual tire sizes on a work machine, or that identifies a relationship among the sizes of the different tires. The tire sizes or the relationship is then used in generating a torque command so that the torque output of each motor can be more accurately controlled.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). They can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, identifiers, and/or logic. It will be appreciated that such systems, components, generators, identifiers, and/or logic can be comprised of hardware items (such as processors and associated memory, or other processing components, some of which are described below) that perform the functions associated with those systems, components generators, identifiers, and/or logic. In addition, the systems, components, generators, identifiers, and/or logic can be comprised of software that is loaded into a memory and is subsequently executed by a processor or server, or other computing component, as described below. The systems, components, generators, identifiers, and/or logic can also be comprised of different combinations of hardware, software, firmware, etc., some examples of which are described below. These are only some examples of different structures that can be used to form the systems, components, generators, identifiers, and/or logic described above. Other structures can be used as well.

Figure 5:
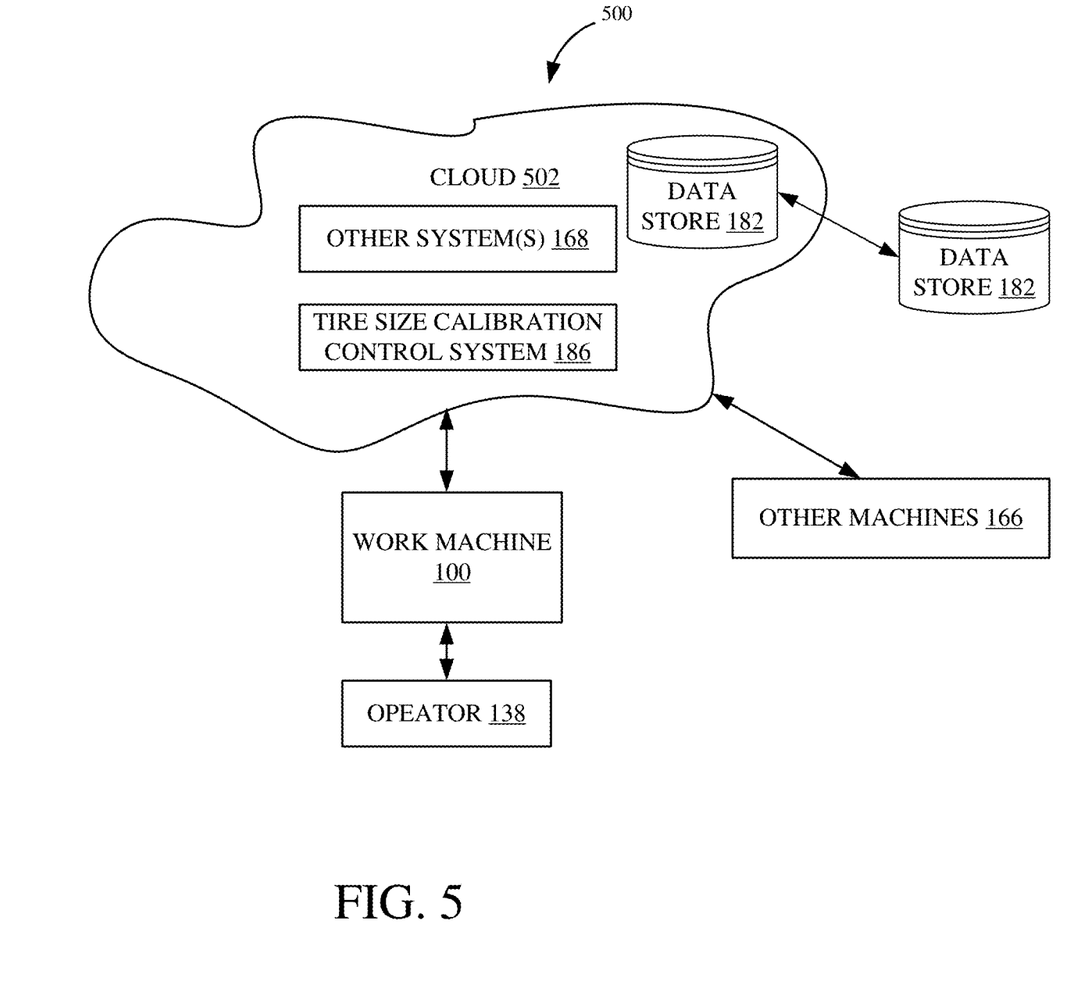
FIG. 5 is a block diagram showing one example of the work machine illustrated in FIGS. 1-3, deployed in a remote server environment.

FIG. 5 is a block diagram of work machine 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in previous FIGS and they are similarly numbered. FIG. 5 specifically shows that tire size calibration and control system 186, and other systems 168, and data store 182 can be located at a remote server location 502. Therefore, machine 100 accesses those systems through remote server location 502.

FIG. 5 also depicts another example of a remote server architecture. FIG. 5 shows that it is also contemplated that some elements of previous FIGS are disposed at remote server location 502 while others are not. By way of example, data store 182 can be disposed at a location separate from location 502, and accessed through the remote server at location 502. Regardless of where the items are located, the items can be accessed directly by machine 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 100 comes close to the fuel truck for fueling, the system automatically collects the information from the machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 100 until the machine 100 enters a covered location. The machine 100, itself, can then send the information to the main network.

It will also be noted that the elements of previous FIGS, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
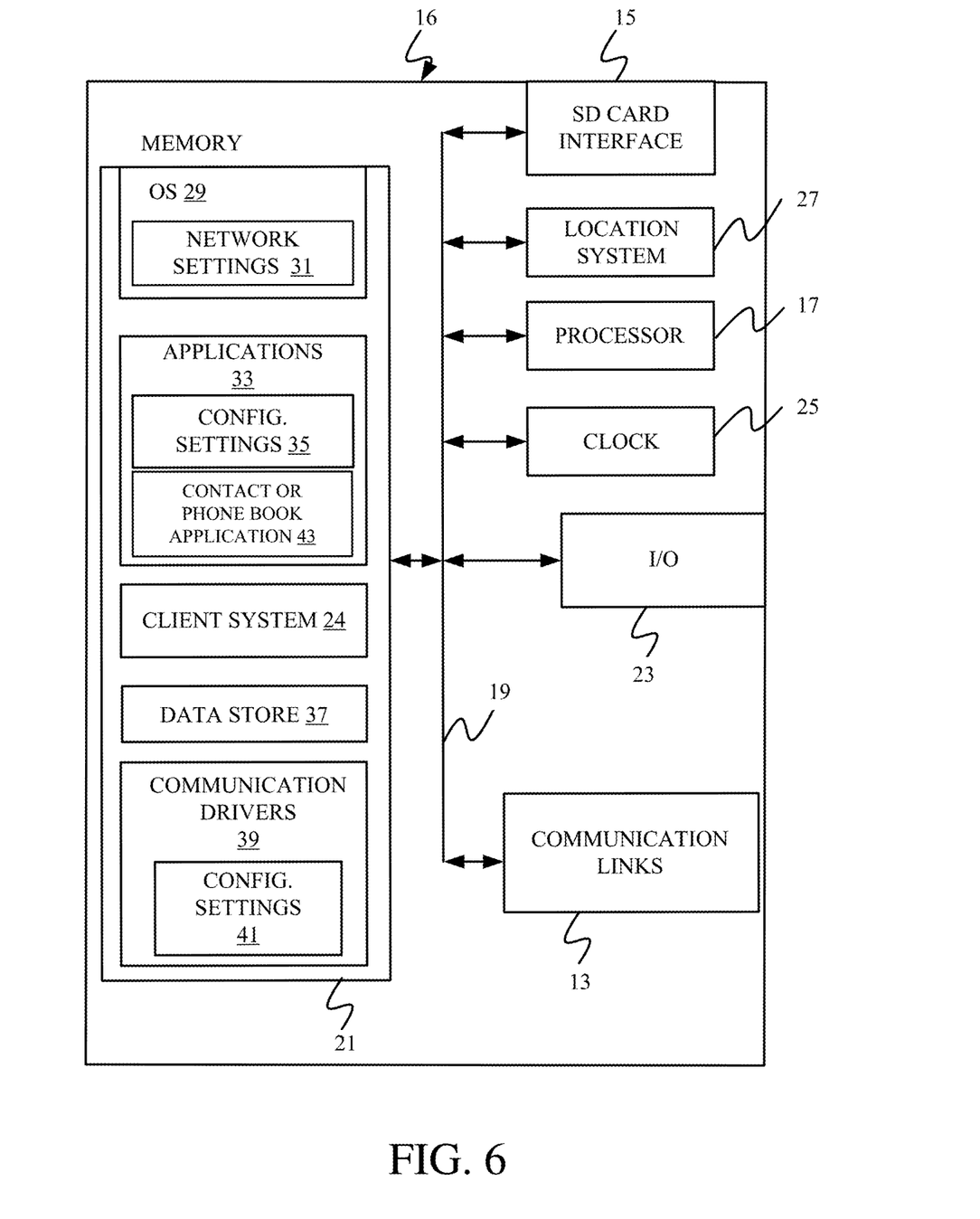
FIGS. 6-8 show examples of mobile devices.
Figure 7:
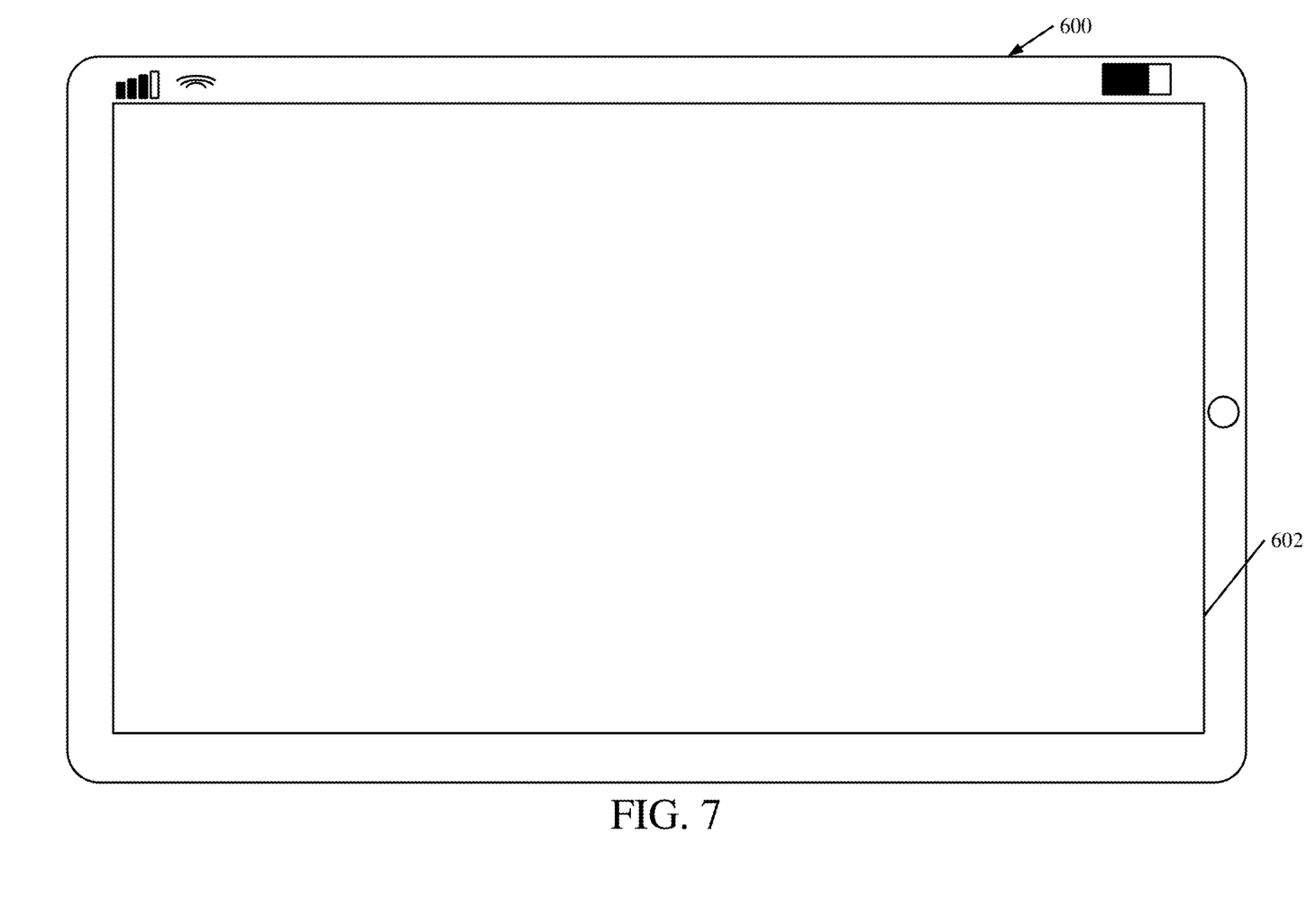
Figure 8:
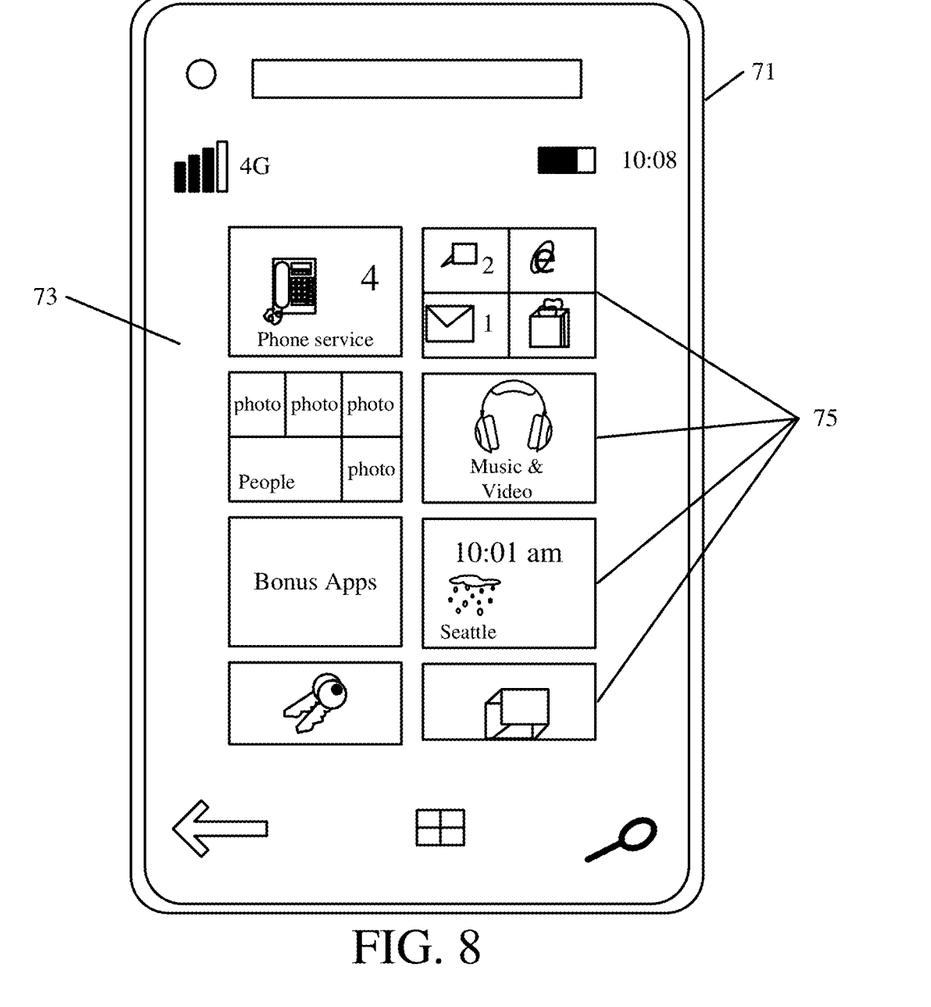
Figure 9:
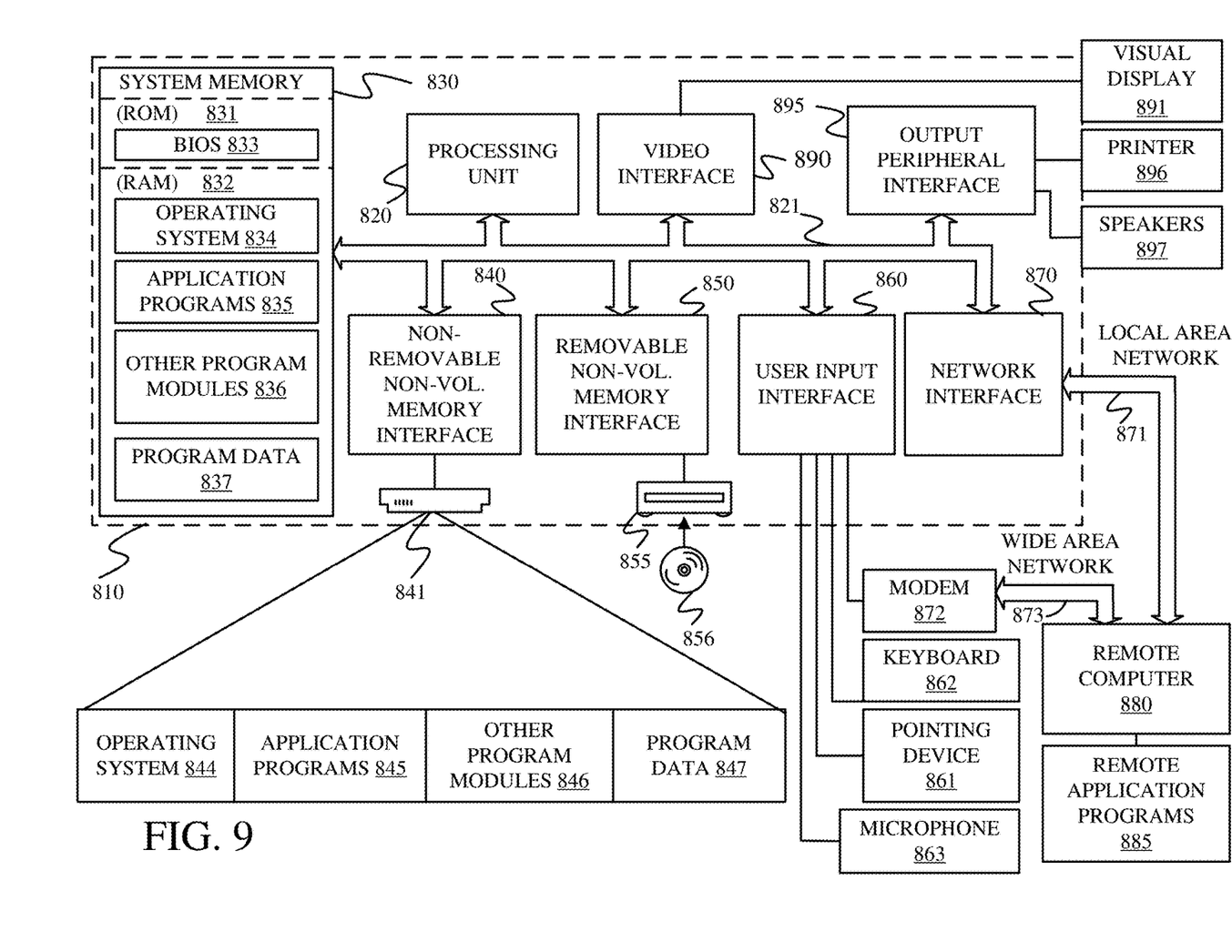
FIG. 9 is a block diagram showing one example of a computing environment.

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 100 for use in generating, processing, or displaying the tire size data. FIGS. 7-9 are examples of handheld or mobile devices.

FIG. 6 provides a general block diagram of the components of a client device 16 that can run some components shown in previous FIGS, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or sensors from previous FIGS) along a bus 19 that is also connected to memory 21 and input/output (I/O) components 23, as well as clock and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of previous FIGS, or parts of them, (for example) can be deployed. With reference to FIG. 9, an example system for implementing some embodiments includes a computing device in the form of a computer 810 programmed to operate as described above. Components of computer 810 may include, but are not limited to, a processing unit 820 (which can comprise processors or servers from previous FIGS), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only. FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a work machine having a plurality of motors, the method comprising:
automatically detecting a size of each respective tire of a plurality of tires, each respective tire of the plurality of tires being driven by a separate motor of the plurality of motors, wherein automatically detecting the size of each respective tire comprises:
commanding the separate motor to drive the respective tire to a calibration speed, wherein the separate motor is coupled to the respective tire by a drive link having a gear ratio;
detecting a rotational velocity of the separate motor driving the respective tire;
calculating a rotational velocity of the respective tire based on the rotational velocity of the separate motor driving the respective tire and based on the gear ratio of the drive link; and
automatically detecting the size of the respective tire based on the rotational velocity of the respective tire and the calibration speed;
generating a size indicator indicative of the size of each of the plurality of tires; and
generating a separate motor torque command control signal for each of the plurality of motors based on the size indicator.

2. The method of claim 1 wherein automatically detecting the size of the respective tire comprises:
detecting an absolute rolling radius of the respective tire based on the rotational velocity of the respective tire and the calibration speed.

3. The method of claim 1 wherein automatically detecting the size of the respective tire of the plurality of tires comprises:
detecting a relative size of the respective tire of the plurality of tires relative to other tires of the plurality of tires.

4. The method of claim 2 and further comprising:
detecting ground speed of the work machine.

5. The method of claim 4 wherein automatically detecting the size of the respective tire comprises:
detecting the size of the respective tire of the plurality of tires based on the rotational velocity of the respective tire and based on the detected ground speed of the work machine.

6. The method of claim 1 and further comprising:
prior to automatically detecting the size of each tire, detecting a presence of calibration conditions corresponding to the work machine.

7. The method of claim 6 wherein the work machine is an articulated work machine and wherein detecting the presence of calibration conditions comprises:
detecting an articulation angle of the articulated work machine; and
determining that the articulation angle of the articulated work machine is within a range of articulation angles.

8. The method of claim 6 wherein detecting the presence of calibration conditions comprises at least one of:
determining that a pose of the work machine is within a range of poses; or
determining that the work machine is on a surface having a predefined characteristic.

9. The method of claim 1 and further comprising:
prior to detecting the size of each tire, detecting an automatically generated calibration trigger, and automatically detecting the size of each tire in response to detecting the automatically generated calibration trigger.

10. A work machine, comprising:
a plurality of tires;
a plurality of motors, each respective motor, of the plurality of motors, driving a corresponding tire of the plurality of tires and being coupled to the corresponding tire by a drive link having a gear ratio;
a tire size generation system automatically detecting a size of each tire and generating a size indicator indicative of the size of each of the tires, wherein the tire size generation system comprises:
a calibration speed selector that identifies a calibration speed and commands a selected motor of the plurality of motors to the calibration speed;
a rotational velocity generator that detects a rotational velocity of the selected motor and calculates a rotational velocity of the corresponding tire based on the rotational velocity of the selected motor driving the corresponding tire and based on the gear ratio of the drive link; and
a tire size identifier that identifies a size of the corresponding tire based on the calibration speed and the rotational velocity of the corresponding tire; and
a torque command generator generating a separate motor torque command control signal for one or more motors, of the plurality of motors, based on the size indicator.

11. The work machine of claim 10 and further comprising:
a tire size relationship identifier that identifies a set of tire size relationships indicative of the sizes of each of the plurality of tires relative to one another and to generate a relationship identifier indicative of the set of tire size relationships.

12. The work machine of claim 10 wherein each motor is connected to a corresponding tire by a link that has a gear ratio and wherein the rotational velocity generator comprises:
a rotational velocity sensor on each motor sensing a rotational velocity of the motor.

13. The work machine of claim 10, wherein the size indicator indicates an absolute rolling radius of each tire.

14. The work machine of claim 10, wherein the torque command generator comprises a traction control system.

15. A motor speed control system on a work machine configured to operate on a worksite, the motor speed control system comprising:
a tire size identification system configured to:
detect a presence of a calibration condition representing a characteristic of at least one of the work machine or the worksite; and
in response to the presence of the calibration condition, identify a calibration speed,
command a motor to the calibration speed, wherein the motor is coupled to a respective tire by a drive link having a gear ratio,
detect a rotational velocity of the motor driving the respective tire,
calculate a rotational velocity of the respective tire based on the rotational velocity of the motor driving the respective tire and based on the gear ratio of the drive link,
automatically identify a size of the respective tire based on the calibration speed and the rotational velocity of the respective tire, and
generate a size indicator indicative of the size of the respective tire; and
a control system configured to generate a separate motor torque command control signal for the motor based on the size indicator.

16. The motor speed control system of claim 15, and further comprising a sensor configured to sense the characteristic.

17. The motor speed control system of claim 15, wherein the characteristic comprises at least one of:
an orientation of the work machine;
a slope of the worksite;
a soil characteristic of the worksite; or
an articulation angle of the work machine.

* * * * *